(12) United States Patent
Pancurák et al.

(10) Patent No.: US 8,691,059 B2
(45) Date of Patent: Apr. 8, 2014

(54) DEVICE FOR GALVANIC PROCESSING OF DRINKING WATER

(76) Inventors: Františ ek Pancurák, Prešov (SK); Ladislav Jurec, Prešof (SK)

(\*) Notice: Subject to any disclaimer, the term of this patent is extended or adjusted under 35 U.S.C. 154(b) by 122 days.

(21) Appl. No.: 13/207,579

(22) Filed: Aug. 11, 2011

(65) Prior Publication Data

US 2012/0037498 A1    Feb. 16, 2012

(30) Foreign Application Priority Data

Aug. 11, 2010 (SK) ..................... 86-2010

(51) Int. Cl.
*C02F 1/46* (2006.01)

(52) U.S. Cl.
USPC ........... 204/248; 204/668; 204/669; 205/745; 210/748.18

(58) Field of Classification Search
CPC ................................ C02F 1/463; C02F 1/465
USPC .......... 204/248, 289, 668, 669; 205/742–761; 210/748.18
See application file for complete search history.

(56) References Cited

U.S. PATENT DOCUMENTS

| | | | |
|---|---|---|---|
| 540,608 A | 6/1895 | Collier et al. | |
| 547,710 A | 10/1895 | Cassard | |
| 866,618 A | 9/1907 | Brannon | |
| 2,424,145 A | 7/1947 | Butler | |
| 2,451,067 A | 10/1948 | Butler | |
| 2,548,584 A | 4/1951 | Briggs | |
| 2,670,327 A * | 2/1954 | Rader | 204/248 |
| 2,754,260 A | 7/1956 | Butler | |
| 2,930,568 A * | 3/1960 | Rader | 204/196.15 |
| 2,974,747 A | 3/1961 | Coolidge, Jr. et al. | |
| 3,026,259 A | 3/1962 | Phillips | |
| 3,286,922 A | 11/1966 | Franz | |
| 3,392,102 A | 7/1968 | Koch | |
| 3,728,245 A | 4/1973 | Preis et al. | |
| 3,974,071 A | 8/1976 | Dunn et al. | |
| 4,126,544 A * | 11/1978 | Baensch et al. | 210/610 |
| 5,695,644 A * | 12/1997 | Buchanan et al. | 210/696 |
| 5,814,227 A | 9/1998 | Pavlis | |
| 6,264,837 B1 | 7/2001 | Marsden | |

(Continued)

FOREIGN PATENT DOCUMENTS

UA      61 317      12/2002

*Primary Examiner* — Nicholas A Smith
*Assistant Examiner* — Ciel Thomas
(74) *Attorney, Agent, or Firm* — Greer Burns & Crain, Ltd.

(57) ABSTRACT

A galvanic processing device includes a flow container having an inlet, an outlet and a longitudinal axis. Anodes are made from a first metal. Cathodes are made from a second, different metal. The electrodes may be disk-shaped. The cathodes and anodes are alternately placed perpendicular to the longitudinal axis. Dielectric spacer rings separate the anodes and the cathodes. The electrodes may have circumferential segments aligned at an angle α to impart a swirl to a flow of liquid through the container. A portion of the anodes and cathodes may have the circumferential segments aligned at an angle −α a to reverse the direction of the swirl of the flow through the flow container. Portions of the circumferential segments may be aligned at an angle α and other portions are aligned at an angle β so that the swirl of the flow through the flow container has components with different directions.

25 Claims, 4 Drawing Sheets

(56) References Cited

U.S. PATENT DOCUMENTS

| | | |
|---|---|---|
| 6,605,212 B2 | 8/2003 | Marsden |
| 6,663,783 B2 | 12/2003 | Stephenson et al. |
| 6,689,270 B1 | 2/2004 | Evert |
| 2001/0020598 A1* | 9/2001 | Marsden .................. 210/199 |
| 2002/0036172 A1* | 3/2002 | Del Signore .............. 210/748 |
| 2006/0102492 A1* | 5/2006 | Corradi et al. ............ 205/466 |
| 2007/0048199 A1 | 3/2007 | Lee |

\* cited by examiner

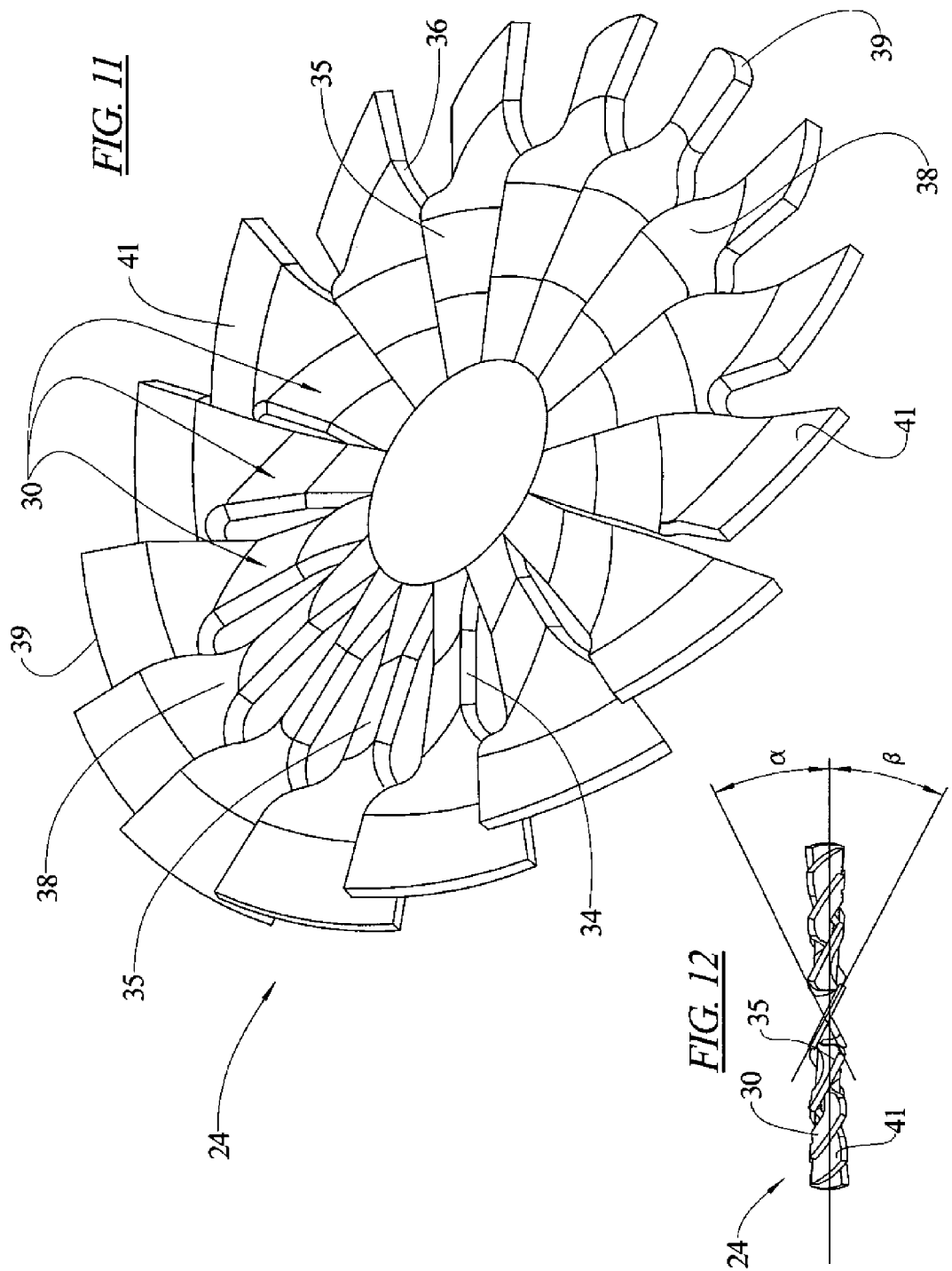

DEVICE FOR GALVANIC PROCESSING OF DRINKING WATER

FIELD OF THE INVENTION

This invention relates to galvanic processing of drinking water. More specifically, it relates to a device that changes the ion composition of liquids and especially drinking water by galvanic action between two dissimilar metals.

BACKGROUND OF THE INVENTION

Differences in electrical potential of various ions in aqueous solutions are well documented. These differences are exploited in a galvanic cell. In galvanic cells, two dissimilar metals act as the anode and cathode of an electrolytic cell. At the anode, electrons are withdrawn from the metal atoms and the resulting positive ions enter the electrolyte. Positive ions are combined with the electrons at the cathode, causing atoms to deposit there. By appropriate selection of the cathode and anode, certain ions present in the electrolyte can be made to deposit on the cathode, while the ions entering the electrolyte at the anode remain in the electrolytic medium.

In addition to removing the ions that plate out on the cathode, removal of one or more of the ions can cause other changes in the ions present in the electrolyte due to changes in the chemical equilibrium. Decrease in the concentration of a particular cation potentially leads to an excess in the associated anion. The excess anion may combine with another cation which causes precipitation of the compound because it was less soluble than the original compounds. Where a large number of ionic compounds are present, this can have a "domino" effect, leading to rearranging of a number of the ions. Some of the resulting compounds may be more soluble in the electrolyte and never plate out. Others may precipitate immediately under controlled conditions.

Water that is slightly alkaline has been found to be more activated than water having a neutral pH.

Activated fluids have better bio-energetic and information properties: first of all, it is the hydrogen exponent balance and the pH quantity. Further properties include the informative quantities of specific electric conductivity measured in $\mu S$, the total concentration of electrically neutral soluble ingredients measured in mg/l, and the oxidation reduction potential measured in mV.

The generation of turbulences and vortices in a moving liquid to result in a change in the bioenergetic properties of the liquid was studied and discussed by Viktor Schauberger and is described in several books and internet sites, including "Living Water"—Viktor Schauberger and the Secrets of Natural Energy by Olof Alexandersson (1976) and http://www.pks.or.at/menu_en.html. Viktor Schauberger described the effect caused by turbulences and vortices to be a "vitalizing" effect, which term is used herein.

SUMMARY OF THE INVENTION

The invention is an improved galvanic processing device that includes a flow container made from a non-conducting material and having an inlet, an outlet and a longitudinal axis. The inlet is in fluid communication with the outlet to allow fluid flow through said flow container. One or more anodes are made from a first metal. They are disk-shaped and have circumferential segments that, in a first embodiment, are aligned at an angle $\alpha$ relative to the plane of the circumference of the anode. The flow container also includes one or more cathodes made from a second metal that is different from the first metal. In a first embodiment, the cathodes are shaped like the anodes, being disk-shaped and having circumferential segments aligned at an angle $\alpha$ relative to the plane of the circumference of the cathode. The angle $\alpha$ causes a swirling of a flow of liquid through the flow container, creating a vitalizing effect of the fluid. The cathodes and anodes are alternately placed substantially perpendicular to the longitudinal axis of the flow container. Non-conducting spacer rings separate each of the anodes and the cathodes from each other. The galvanic action results in an activation of the liquid, such as water.

In a second embodiment, a portion of the anodes and cathodes have the circumferential segments aligned at an angle $-\alpha$ relative to the plane of the circumference. This creates a different direction of flow as the fluid moves through the flow container. In the first embodiment, the circumferential segments direct the fluid to flow in a given direction, for example, to swirl to the right in a clockwise direction. When some of the electrodes are aligned at the angle $-\alpha$, fluid flow changes direction, such as by swirling to the left in a counterclockwise direction. Turbulences are associated with the directional change. The physical effect of the swirling and turbulences provides a vitalizing effect on the liquid.

In another embodiment, a portion of each of the circumferential segments of the anodes and cathodes is aligned at an angle $\alpha$ while another portion of each of the circumferential segments is aligned at an angle $\beta$ which is different from angle $\alpha$. This change causes a portion of the flow of fluid to spiral in one direction and another portion of the flow of fluid to spiral in another direction, again causing swirling and turbulences and a vitalizing effect.

A metallic lining on the interior wall of the flow container acts as one electrode in another embodiment of the invention. The other electrode is included in the inner chamber, allowing ion exchange between the circumferential segments and the coating. The dielectric spacer is positioned on the inner surface of the coating to separate the coating from the circumferential segments.

Activated and vitalized fluids have better bio-energetic and information properties: first of all, it is the hydrogen exponent balance and the pH quantity. Further properties include the informative quantities of specific electric conductivity measured in $\mu S$, the total concentration of electrically neutral soluble ingredients measured in mg/l, and the oxidation reduction potential measured in mV.

BRIEF DESCRIPTION OF THE DRAWINGS

FIG. 11 is a perspective elevation view of a second embodiment of an electrode.

FIG. 12 is a side view of the electrode of FIG. 11.

DETAILED DESCRIPTION OF THE INVENTION

A galvanic processing device, generally 10, is disclosed for the treatment of water or other fluid. The device can be sized to fit personal devices, such as water bottles or other containers. Containers for the activation of drinkable liquids are more particularly described in co-pending patent application Ser. No. 13/207,601, which is incorporated herein in its entirety by reference. The galvanic processing device 10 is easily scaled up for use with higher volumes of fluid delivered by hoses or pipes.

Figure 1:
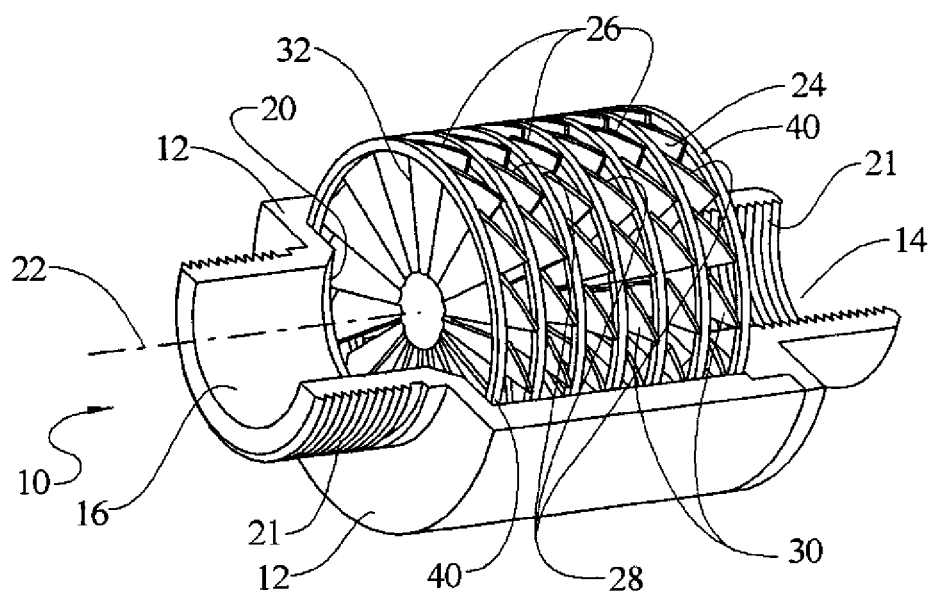
FIG. 1 is a perspective drawing of a first embodiment of the processing device with a portion of the flow container cut away.

Referring to FIG. 1, the device 10 includes a flow container, generally 12, made from a non-conducting material. In addition to being non-conducting, the material should be able to carry a fluid such as water without leaking. Plastics are particularly good choice for the flow container 12, however, other materials, such as rubber or ceramics, could also be used. Another option is to use a material that is not inherently fluid-tight, but includes a lining or coating to make it fluid resistant. For a device to be used once or a limited number of times, the flow container 12 could be made of coated or laminated paper or cardboard.

An inlet 14 and an outlet 16 are positioned to allow flow of a fluid between them through an inner chamber 20 of the flow container 10. Water is a common fluid to be processed by galvanic devices, but use with other fluids is also contemplated.

In some embodiments of the invention, the inlet 14 is positioned at an end opposing the outlet 16, but use of other positions is contemplated. The inlet 14 is includes a connecting device 21 for connection to a fluid source (not shown), such as a container, hose, pipe, tube, pressure tank and the like. Optionally, the outlet 16 also includes a connecting device 21 for connection to a fluid receiver (not shown) which may be the same or different from the connecting device of the inlet 14. In some embodiments, such as a personal water bottle, the fluid does not go to a fluid storage or transfer device. In such cases, the outlet 16 is optionally configured to be the same as the inlet 14 so that the inlet and outlet are interchangeable. A common configuration for such connection is threads. Threads are easily attached to each other to make a connection that is physically strong and fluid-tight. The flow container 12 also has a longitudinal axis 22. In some embodiments, the inlet 14 and outlet 16 are positioned at opposing ends of the longitudinal axis 22.

Within the inner chamber 20 of the flow container are several electrodes 24 that enable the galvanic treatment. Electrodes which may be used in the present device are more particularly described in co-pending patent application Ser. No. 13/207,573, and which is incorporated herein in its entirety by reference. The inner chamber 20 may be of any shape. In some embodiments, a cylindrical inner chamber 20 is found. It is advantageous that the inner chamber has a size and shape to accommodate electrodes 24 without allowing a significant amount of water to bypass the electrodes. The electrodes 24 include one or more anodes 26 and one or more cathodes 28.

The anodes 26 are made from a first metal and the cathodes 28 are made from a second metal. Any metals can be used as long as the first metal and the second metal are dissimilar, especially regarding their electronegativity, and have distinctive conductive capacities. Galvanic activity of various metals is well known. The first metal is the metal having the higher galvanic activity and will become the anode 26. Less active second metals act as the cathode 28. Examples of preferred anodes 26 are zinc and aluminum. Preferred cathodes 28 are exemplified by copper, brass, stainless steel and carbon. In some embodiments, combinations of useful anodes 26 and cathodes 28 are zinc-copper, zinc-brass, zinc-stainless steel, aluminum-copper, aluminum-brass and zinc-carbon.

Electrodes 24 of any shape are useful in the device 10, however, in preferred embodiments they substantially have the shape of a disk. The circular cross-section of the disk improves the ratio of the surface area which contacts the fluid compared to the volume of the electrode 24. Thickness of the disk should be reduced to reduce bulk of the device and because additional thickness makes a negligible contribution to the surface in contact with the moving fluid.

Figure 2:
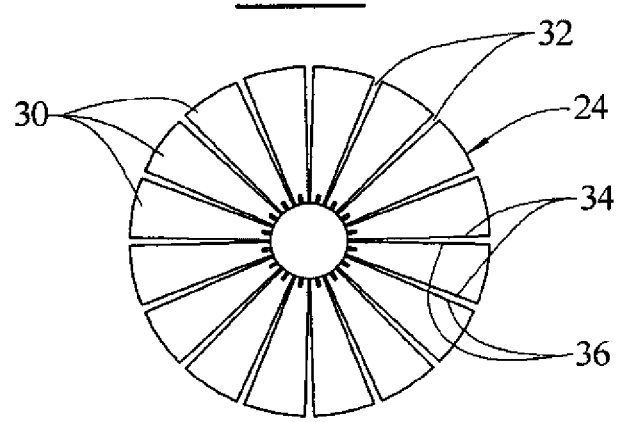
FIG. 2 is a top view of an electrode within the processing device of FIG. 1.
Figure 3:
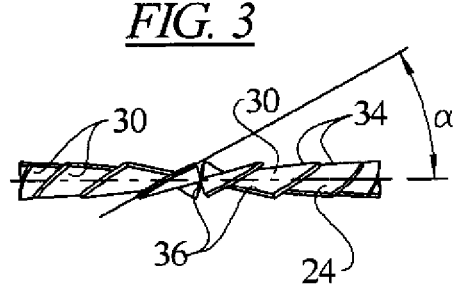
FIG. 3 is a side view of the electrode of FIG. 2.

Turning to FIGS. 2 and 3, each of the electrodes 24 has circumferential segments 30 originating near the center of the electrode. Radial slits 32 divide the electrode into a plurality of circumferential segments 30 each having a leading edge 34 and a trailing edge 36. Each circumferential segment 30 is optionally planar and rotated so that the leading edge 34 of the segment is axially displaced relative to the trailing edge 36 of the adjacent circumferential segment. In a first embodiment shown in FIGS. 1-3, the circumferential segments 30 of all of the electrodes 24 have the leading edge 34 displaced upwardly at an angle α while the trailing edge 36 is displaced downwardly at the same angle. In preferred embodiments, α varies between 15° and 75°. Displacement of the each leading edge 34 in the same direction channels the fluid to flow in a spiral between adjacent electrodes 24. This improves contact between the fluid and the electrodes 24, and reduces the amount of fluid that stagnates close to the wall of the inner chamber 20. The spiral swirling of the fluid also has a vitalizing effect on the fluid.

In another embodiment of the electrodes, the circumferential segment 30 is optionally bent in another direction at a second location 38 at an angle β, also within the range of 15° to 75°, close to the end of the segment opposite the free end 39 of the electrode as shown in FIGS. 11 and 12. The second location bend 38 results in a distal tab 41 that is angled differently than the angle of the arm 35 of each segment 30. This different angle will cause a change in the direction of the fluid flow along the radial length of the segments 30, and may cause some overall turbulence in the fluid flow, particularly if the difference in the angles is large. In an embodiment, the angle β may be in an opposite direction relative to the angle α and in comparison to the plane of the disk (as shown in FIG. 11) which will cause a reversal of fluid flow in the radial outer regions of the disk, generating turbulence and enhancing the activation and vitalizing effects on the fluid flowing across the electrodes. For example, the angle α may be in the range between 15° and 75° and the angle β may be in the range between −15° and −75° relative to the plane of the disk.

Regardless of the shape of electrodes 24, the inner chamber 20 is preferably shaped to receive the electrodes but to have little space for the fluid to bypass them. Within the inner chamber 20, the electrodes are aligned along the flow path of the fluid between the inlet 14 and the outlet 16. In many embodiments, the electrodes 24 are aligned with the disks substantially perpendicular to the longitudinal axis 22, alternating the anodes 26 and cathodes 28. Spacers 40 constructed of a dielectric material are placed between each anode 26 and cathode 28 to separate them. The dielectric material allows electrons to pass through it from the anode to the cathode, completing the galvanic circuit. Examples of suitable dielectric materials include plastics and ceramics. When placed around the ends of the circumferential segments 30, the spacers 40 keep the segments between adjacent electrodes 24 physically separated, even when forces of the moving fluid act upon them.

Figure 4:
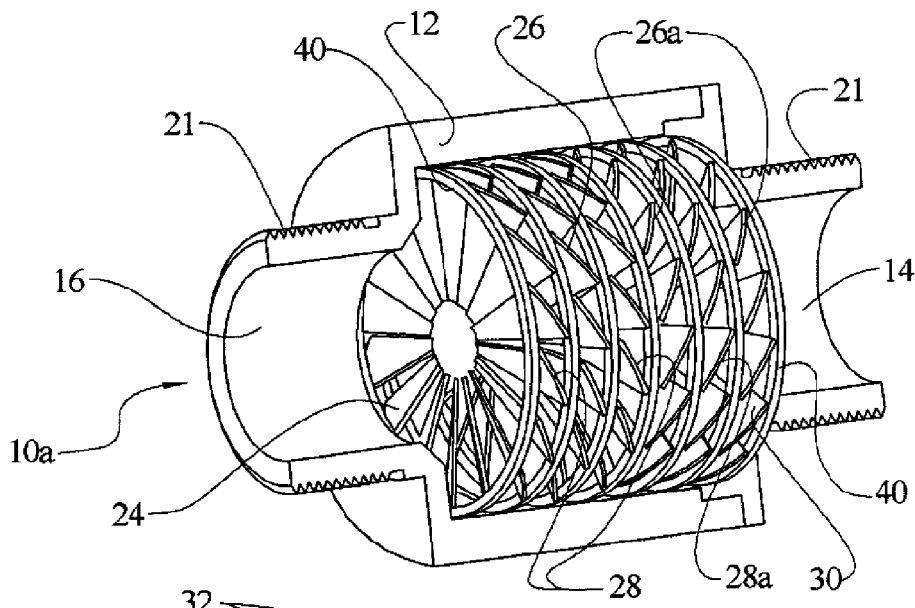
FIG. 4 is a perspective drawing of a second embodiment of the processing device with a portion of the flow container cut away.
Figure 5:
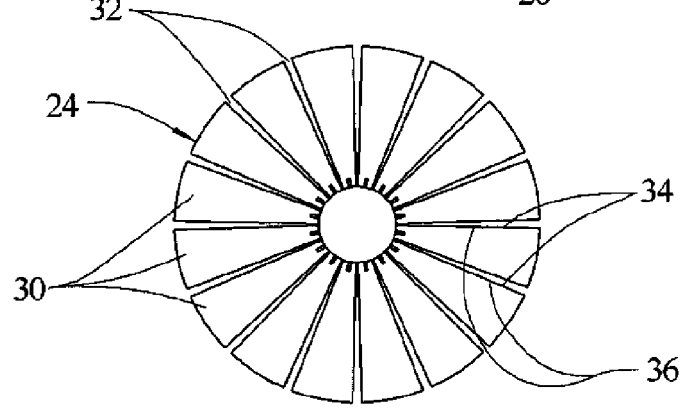
FIG. 5 is a top view of either the first electrode of the second electrode of the processing device of FIG. 4.
Figure 6:
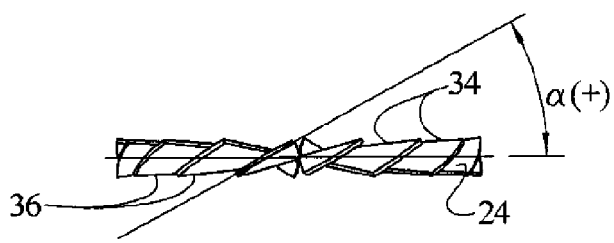
FIG. 6 is a side view of the first electrode of FIG. 5.
Figure 7:
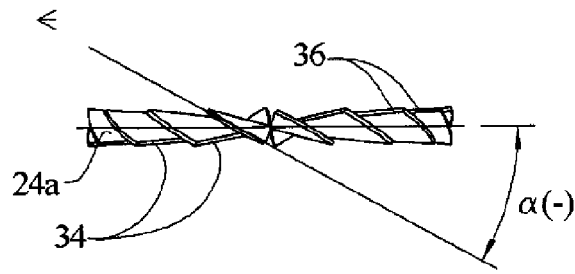
FIG. 7 is a side view of the second electrode of FIG. 6.

Referring to FIGS. 4-6, a further embodiment of the invention is shown. In this and the other alternate embodiments below, features of the embodiment of FIG. 1 are incorporated herein unless otherwise noted. Parts the same as those designated previously have the same numbers. A device, generally 10a, for galvanic treatment of the fluid is shown whereby some of the electrodes 24 (including anodes 26 and cathodes 28) are as described in the first embodiment above. Other electrodes 24a (which include anodes 26a and cathodes 28a) have circumferential segments 30a rotated to an angle $-\alpha$, which is equivalent to having the leading edge 34 displaced downwardly with respect to the trailing edge 36 of the adjacent segment. Changing the angle from $\alpha$ to $-\alpha$ reverses the direction of spiral flow of the fluid. This causes turbulence in the vicinity of the reversal.

Figure 8:
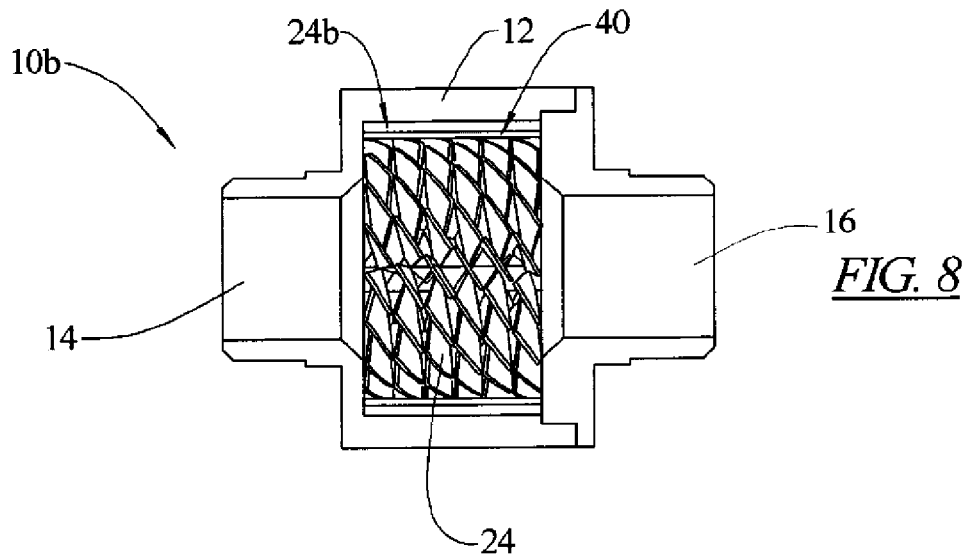
FIG. 8 is a perspective view of another embodiment of the processing device with a portion of the flow container cut away.
Figure 9:
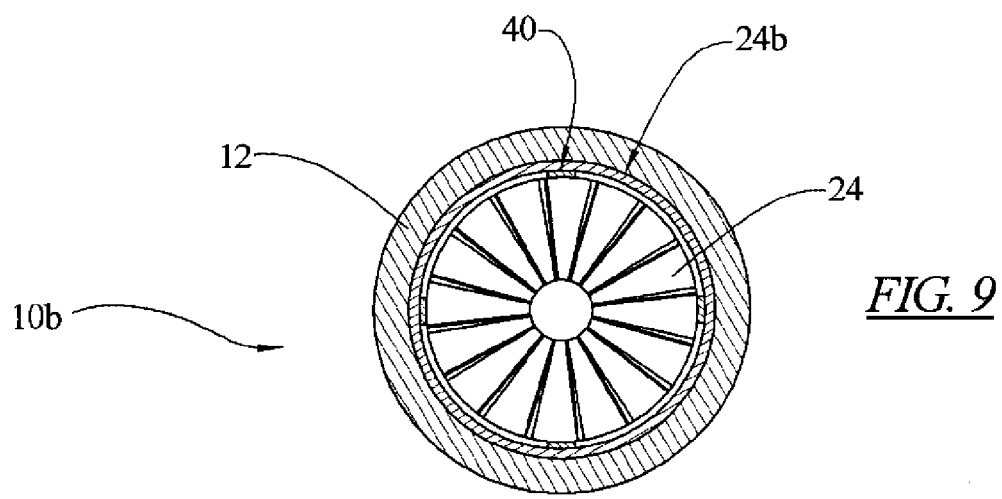
FIG. 9 is a top view of the embodiment of FIG. 8 with a portion of the flow container cut away.

Another embodiment of the device, generally 10b, is shown in FIGS. 8-9, where like parts are represented by like numerals. In this embodiment, an alternate electrode 24b is a sheet metal coating on the inner surface of the flow container 12. The alternate electrode 24b is one of the anode 26 or the cathode 28. The electrodes 24 within the inner chamber 20 are the other of the anode 26 or the cathode 28. In the example shown in FIGS. 8 and 9, the alternate electrode 24b is the anode 26 while the electrode 24 is the cathode 28. It is to be understood that the functions of these two electrodes 24, 24b can be reversed.

Figure 10:
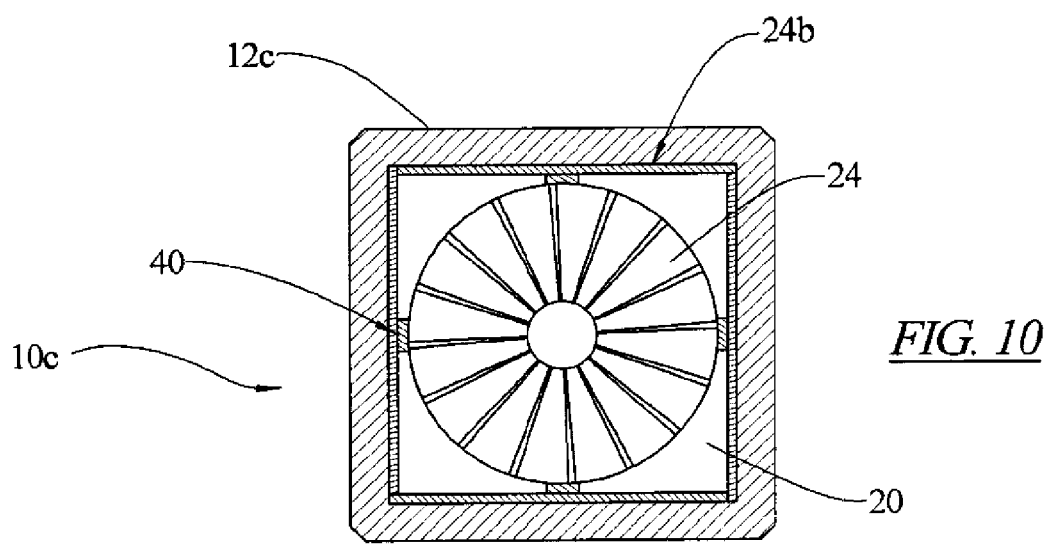
FIG. 10 is a top view of another embodiment of the device with a portion of the flow container cut away.

In another embodiment shown in FIG. 10, the device, generally 10c, has the features of the previous embodiment, however, the shape of the flow container 12c is square or rectangular in cross section.

In practice, the galvanic processing device 10 is mounted to a fluid source, such as the personal water bottle. The inlet 14 of the device is connected to the fluid source by the connecting device 21. As the water is transferred from the bottle, it flows through the device 10. Water travels through the inlet 14, and into the inner chamber 22. The angle of the circumferential segments 30 direct the water to swirl around the electrodes 24, causing it to contact the alternating anodes 26 and cathodes 28 where ion exchange occurs.

While particular embodiments of the galvanic processing device for water have been shown and described, it will be appreciated by those skilled in the art that changes and modifications may be made thereto without departing from the invention in its broader aspects and as set forth in the following claims.

What is claimed is:

1. A galvanic processing device comprising:
   a flow container made from a non-conducting material and having an inlet, an outlet and a longitudinal axis, said inlet being in fluid communication with said outlet to allow fluid flow in a flow path through an inner chamber of said flow container;
   one or more anodes made from a first metal, said anodes being disk-shaped and having circumferential segments aligned at an angle $\alpha$ relative to the plane of the circumference of the anode;
   one or more cathodes made from a second metal different from said first metal, said cathodes being disk-shaped and having circumferential segments aligned at an angle $\alpha$ relative to the plane of the circumference of the cathode, said cathodes and anodes being alternately placed perpendicular to the longitudinal axis of said flow container within the inner chamber; and
   non-conducting spacer rings separating each of said anodes and cathodes from each other, wherein said non-conducting spacer rings are annular in shape and are located adjacent distal ends of said circumferential segments of said anodes and said
   wherein said anodes and said cathodes lack central apertures.

2. The device of claim 1 wherein said non-conducting spacer rings are made of one of plastic and ceramic.

3. The device of claim 1 wherein at least one of said inlet and outlet is threaded for attachment to a fluid source.

4. The device of claim 1 wherein said first metal is selected from the group consisting of zinc and aluminum.

5. The device of claim 1 wherein said second metal is selected from the group consisting of stainless steel, copper, brass and carbon.

6. The device of claim 1 wherein said anodes and said cathodes are of the same configuration except for the materials thereof.

7. The device of claim 6 wherein said non-conducting spacer rings are the only members positioned between adjacent ones of said anodes and cathodes.

8. The device of claim 1 wherein the angle $\alpha$ is between 15° and 75°.

9. A galvanic processing device comprising:
   a flow container made from a non-conducting material and having an inlet, an outlet and a longitudinal axis, said inlet being in fluid communication with said outlet to allow fluid flow in a flow path through an inner chamber of said flow container;
   one or more first anodes made from a first metal, said first anodes being disk-shaped and having circumferential segments aligned at an angle $\alpha$ relative to the plane of the circumference of the first anode;
   one or more second anodes made from said first metal, said second anodes being disk-shaped and having circumferential segments aligned at an angle $-\alpha$ relative to the plane of the circumference of the second anode;
   one or more first cathodes made from a second metal different from said first metal, said first cathodes being disk-shaped and having circumferential segments aligned at an angle $\alpha$ relative to the plane of the circumference of the first cathode, said first cathodes and first anodes being alternately placed perpendicular to the longitudinal axis of said flow container within the inner chamber;
   one or more second cathodes made from said second metal, said second cathodes being disk-shaped and having circumferential segments aligned at an angle $-\alpha$ relative to the plane of the circumference of the second cathode, said second cathodes and second anodes being alternately placed perpendicular to the longitudinal axis of said flow container within the inner chamber; and
   non-conducting spacer rings separating adjacent pairs of said first anodes and said first cathodes and said second anodes and said second cathodes from each other, wherein said non-conducting spacer rings are annular in shape and are located at adjacent distal ends of said circumferential segments of said first anodes and said first cathodes, as well as at adjacent distal ends of said circumferential segments of said second anodes and said second cathodes,
   wherein said first and second anodes and said first and second cathodes lack central apertures.

10. The device of claim 9 wherein said non-conducting spacer rings are made of one of plastic and ceramic.

11. The device of claim 9 wherein at least one of said inlet and outlet is threaded for attachment to a fluid source.

12. The device of claim 9 wherein said first metal is selected from the group consisting of zinc and aluminum.

13. The device of claim 9 wherein said second metal is selected from the group consisting of stainless steel, copper, brass and carbon.

14. The device of claim 9 wherein said first anodes and said first cathodes are of the same configuration except for the materials thereof.

15. The device of claim 9 wherein said second anodes and said second cathodes are of the same configuration except for the materials thereof.

16. The device of claim 11 wherein the angle $\alpha$ is between 15° and 75°.

17. A galvanic processing device comprising:
a flow container made from a non-conducting material and having an inlet, an outlet and a longitudinal axis, said inlet being in fluid communication with said outlet to allow fluid flow in a flow path through an inner chamber of said flow container;
one or more anodes made from a first metal, said anodes being disk-shaped and having circumferential segments with a first radially inner portion aligned at an angle $\alpha$ relative to the plane of the circumference of the anode and a second radially outer portion aligned at a different angle relative to the plane of the circumference of the anode;
one or more cathodes made from a second metal different from said first metal, said cathodes being disk-shaped and having circumferential segments with a first radially inner portion aligned at an angle $\alpha$ relative to the plane of the circumference of the cathode and a second radially outer portion aligned at a different angle $\beta$ relative to the plane of the circumference of the cathode, said cathodes and anodes being alternately placed perpendicular to the longitudinal axis of said flow container within the inner chamber; and
non-conducting spacer rings separating each of said anodes and cathodes from each other, wherein said non-conducting spacer rings are annular in shape and are located adjacent distal ends of said circumferential segments of said anodes and said cathodes,
wherein said anodes and said cathodes lack central apertures.

18. The device of claim 17 wherein said non-conducting spacer rings are made of one of plastic and ceramic.

19. The device of claim 17 wherein at least one of said inlet and outlet is threaded for attachment to a fluid source.

20. The device of claim 17 wherein said first metal is selected from the group consisting of zinc and aluminum.

21. The device of claim 17 wherein said second metal is selected from the group consisting of stainless steel, copper, brass and carbon.

22. The device of claim 17 wherein said anodes and said cathodes are of the same configuration except for the materials thereof.

23. The device of claim 17 wherein the angle $\alpha$ is between 15° and 75°.

24. The device of claim 17 wherein the angle $\beta$ is between 15° and 75°.

25. The device of claim 17 wherein the angle $\beta$ is between −15° and −75°.

* * * * *